United States Patent
Eliassaf et al.

(10) Patent No.: US 11,082,510 B2
(45) Date of Patent: Aug. 3, 2021

(54) IDENTIFYING A PUSH COMMUNICATION PATTERN

(75) Inventors: Ofer Eliassaf, Modiin (IL); Amir Kessner, Ramat-Gan (IL); Meidan Zemer, Hod-Hasharon (IL); Oded Keret, Yehud (IL); Moshe Eran Kraus, Mazkeret Batya (IL)

(73) Assignee: MICRO FOCUS LLC, Santa Clara, CA (US)

( * ) Notice: Subject to any disclaimer, the term of this patent is extended or adjusted under 35 U.S.C. 154(b) by 223 days.

(21) Appl. No.: 14/373,560

(22) PCT Filed: Jan. 26, 2012

(86) PCT No.: PCT/US2012/022666
§ 371 (c)(1),
(2), (4) Date: Jul. 21, 2014

(87) PCT Pub. No.: WO2013/112153
PCT Pub. Date: Aug. 1, 2013

(65) Prior Publication Data
US 2014/0365576 A1 Dec. 11, 2014

(51) Int. Cl.
*H04L 29/08* (2006.01)
*H04L 12/26* (2006.01)

(52) U.S. Cl.
CPC ........... *H04L 67/26* (2013.01); *H04L 43/062* (2013.01); *H04L 43/0876* (2013.01)

(58) Field of Classification Search
CPC ... H04L 67/26; H04L 43/062; H04L 43/0876; G06F 11/3409

USPC .................................. 709/204, 224; 707/737
See application file for complete search history.

(56) References Cited

U.S. PATENT DOCUMENTS

| | | | |
|---|---|---|---|
| 4,905,288 A * | 2/1990 | Gerson | G10L 15/00 704/234 |
| 6,370,547 B1 * | 4/2002 | Eftink | G06Q 10/06 |
| 7,013,255 B1 * | 3/2006 | Smith, II | H04L 12/5601 703/13 |
| 7,739,351 B2 | 6/2010 | Shkvarchuk et al. | |
| 8,028,104 B2 | 9/2011 | Meyer et al. | |
| 8,694,630 B1 * | 4/2014 | Keralapura | H04L 47/2441 709/223 |
| 9,838,263 B2 | 12/2017 | Eliassaf et al. | |

(Continued)

FOREIGN PATENT DOCUMENTS

| | | |
|---|---|---|
| CN | 101495969 | 7/2009 |
| CN | 101558398 | 10/2009 |

(Continued)

OTHER PUBLICATIONS

Korean Intellectual Property Office, International Search Report and Written Opinion, dated Oct. 29, 2012, 10 pages, Daejeon Metropolitan City, Republic of Korea.

(Continued)

*Primary Examiner* — Suraj M Joshi
*Assistant Examiner* — Sherman Lin

(57) ABSTRACT

A method for identifying a push communication pattern includes creating clusters from a communication entity's response buffers. Clusters that meet a first criterion are detected. The communication entity is identified as having a push communication pattern upon a determination that the detected clusters meet a second criterion.

17 Claims, 3 Drawing Sheets

(56) References Cited

U.S. PATENT DOCUMENTS

| | | | |
|---|---|---|---|
| 2001/0026546 | A1* | 10/2001 | Schieder ............... H04W 76/25 |
| | | | 370/338 |
| 2003/0206192 | A1 | 11/2003 | Chen et al. |
| 2005/0198099 | A1* | 9/2005 | Motsinger ............... G06F 21/55 |
| | | | 709/200 |
| 2006/0206610 | A1* | 9/2006 | Ling ....................... H04W 4/02 |
| | | | 709/226 |
| 2006/0280207 | A1 | 12/2006 | Guarini et al. |
| 2007/0011292 | A1 | 1/2007 | Fritsch et al. |
| 2007/0079379 | A1* | 4/2007 | Sprosts ................ G06Q 10/107 |
| | | | 726/24 |
| 2008/0306715 | A1 | 12/2008 | Tsai et al. |
| 2009/0013387 | A1 | 1/2009 | Paas et al. |
| 2010/0082818 | A1* | 4/2010 | Paul ........................ H04L 67/06 |
| | | | 709/226 |
| 2011/0151944 | A1 | 6/2011 | Morgan |
| 2011/0161417 | A1 | 6/2011 | Le Scouarnec et al. |
| 2011/0258209 | A1* | 10/2011 | Gagliardi ............ G06F 11/3006 |
| | | | 707/758 |
| 2012/0101970 | A1* | 4/2012 | Zernik ................... G06Q 10/10 |
| | | | 706/45 |
| 2012/0110171 | A1* | 5/2012 | Luna ........................ A61B 3/10 |
| | | | 709/224 |

FOREIGN PATENT DOCUMENTS

| | | |
|---|---|---|
| CN | 102113296 | 6/2011 |
| WO | WO-2010150251 A1 | 12/2010 |

OTHER PUBLICATIONS

International Preliminary Report on Patentability, dated Aug. 7, 2014, PCT Patent Application No. PCT/US2012/022666; The International Bureau; Geneva, Switzerland.

Hernandez-Campos, F., et al., Understanding Patterns of TCP Connection Usage with Statistical Clustering, 13th IEEE International Symposium, Sep. 27-29, 2005, 10 pages.

Supplementary European Search Report, European Patent Application No. 12866943.9, dated Mar. 29, 2016, 9 pages.

* cited by examiner

IDENTIFYING A PUSH COMMUNICATION PATTERN

BACKGROUND

Software tools for validating application performance can emulate hundreds or thousands of concurrent users by applying production workloads to an application platform or environment. The emulation puts the application through the rigors of real-life user loads while collecting information from key infrastructure components. Such application performance tools apply consistent, measurable, and repeatable loads to an application under test and then use resulting data to identify scalability issues that can affect real users. An application performance tool may include a virtual user generator that can run scripts to apply the loads to the application under test. To be useful, such scripts should accurately emulate the communication patterns that will be experienced by the application in production.

DRAWINGS

DETAILED DESCRIPTION

Figure 1:
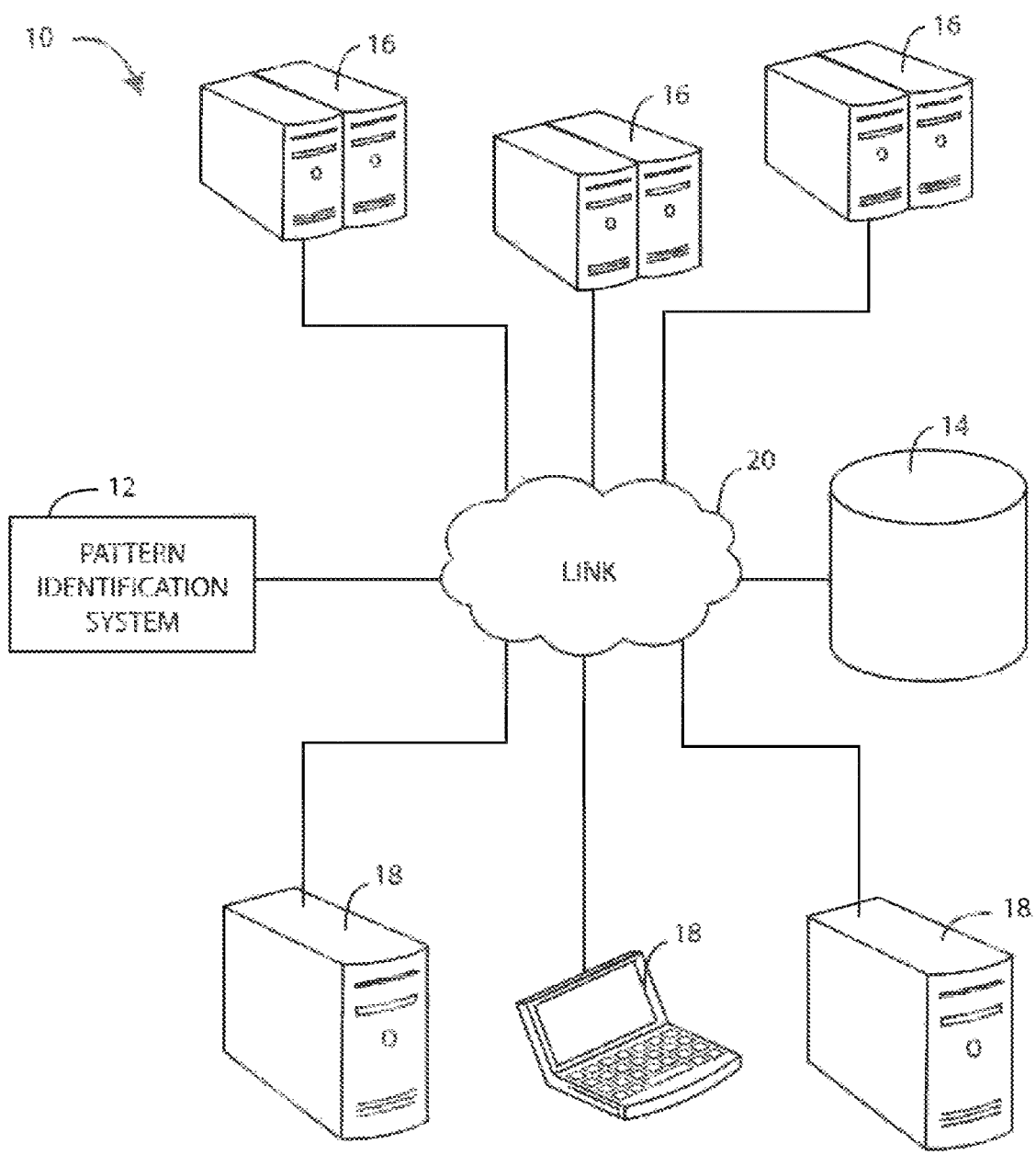
FIG. 1 depicts an environment in which various embodiments may be implemented.

INTRODUCTION: Various embodiments described below were developed to identify push communication patterns within a sequence of communication entities. A communication entity is a request/response pair exchanged between a client and a server. In an example, a client sends an HTTP request directed to the network address of the server, and the server communicates back to the client with an HTTP response.

Push communications are used notify a client of a server side event often in real time. The arrival of an e-mail message and the update of a stock ticker are just two examples of such events. Due to security concerns, the server does not initiate such a notification. Instead, the client opens communication by sending a request to a known address on the server. The server sends a response to the client that appears to be of infinite length. As a result, the client keeps the connection open. When desired, the server sends an update to the client over the established connection. These updates are referred to herein as "sub-messages." If the server has no updates or sub-messages to report, it periodically pings the client to prevent the client from timing out and closing the connection.

Identifying push communications over transport protocols such as HTTP has proven to be complex. All HTTP communication is based on request response round trips (communication entities) and not just an HTTP push. HTTP communication entities for large files may look like push communications. Recording is done in the client side by capturing bytes into socket level buffers. The socket level buffers of the client, over time, will usually differ from the socket level buffers sent by the server. This occurs because the traffic often passes through a number of routers and by different protocols experiencing network latencies. The format or the push message contents is not predictable, but instead determined by the client and server. Furthermore, a client may visit a page containing push for relatively short period.

In an example implementation, identifying a push communication pattern is accomplished by creating clusters from a communication entity's response buffers. Response buffers may be grouped in the same cluster if a difference in their arrival times falls within a predetermined threshold. This clustering technique follows a presumption that the bytes of a given push communication sub-message will be received in a clients response buffers closely in time. Where a sufficient gap exists, the buffers are included in separate clusters and presumably belong to different sub-messages. Clusters that meet a first criterion are detected. In one example, that criterion includes a threshold size such that clusters below that size are detected. The first criterion can help ensure that each cluster detected includes a single sub message or in some cases a relatively small number of sub-messages.

The communication entity is identified as having a push communication pattern upon a determination that the detected clusters meet a second criterion. That second criterion may be selected to require that the detected clusters include a number of clusters that exceeds a predetermined threshold. The criterion may be selected to require that the detected clusters constitute more that a predetermined percentage of all the entity's clusters. The second criterion may also require that the detected clusters together constitute more that a predetermined percentage of the communication entity's response length.

The following description is broken into sections. The first, labeled "Environment," describes and example of a network environment in which various embodiments may be implemented. The second, labeled "Components," describes examples of physical and logical components for implementing various embodiments. The third section, labeled "Operation;" describes steps taken to implement various embodiments.

Figure 2:
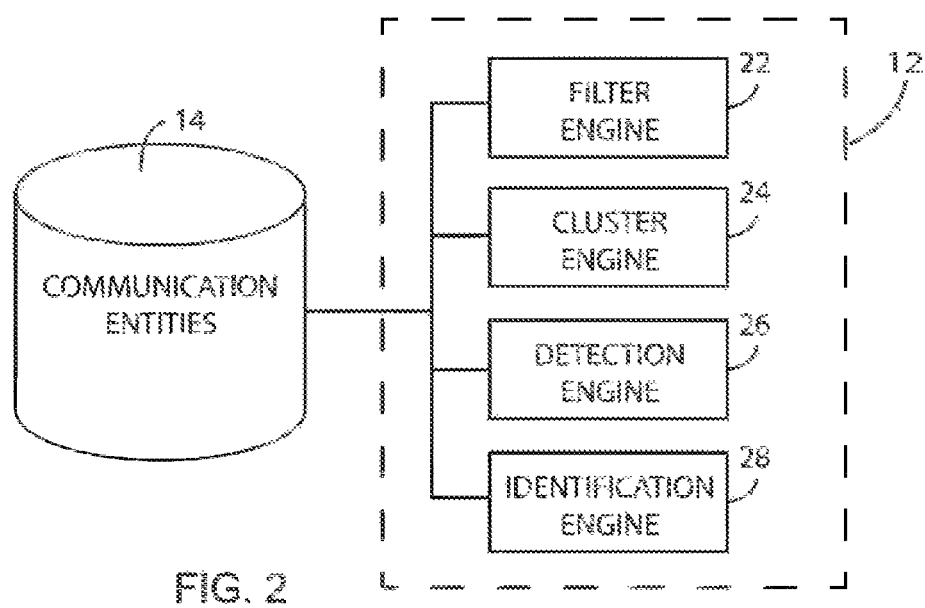
FIG. 2 depicts a system according to an example.
Figure 3:
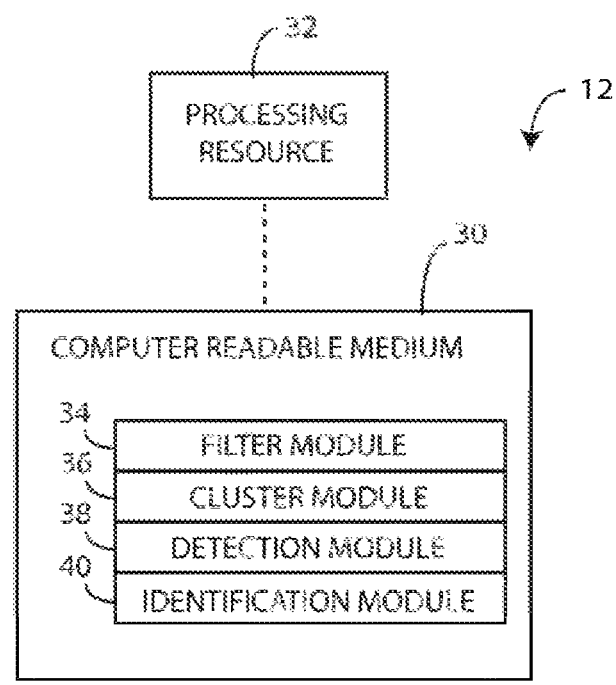
FIG. 3 is a block diagram depicting a memory and a processing resource according to an example.

ENVIRONMENT: FIG. 1 depicts an environment 10 in which various embodiments may be implemented. Environment 10 is shown to include pattern identification system 12, data store 14, server devices 16, and client devices 18, Pattern identification system 12, described below with respect to FIGS. 2 and 3, represents generally any combination of hardware and programming configured to identify a push communication pattern within a sequence of communication entities. Data store 14 represents generally any device or combination of devices configured to store data for use by pattern identification system 12. Such data may include a sequence of recorded communications entities.

In the example of FIG. 1, the sequence of communication entities can represent network communications (such as HTTP traffic) recorded over a period of time between one or more server devices 16 and one or more client devices 18. Server devices 16 represent generally any computing devices configured to respond to network requests received from client devices 18. A given server device 16 may include a web server, an application server, or a data server. Client devices 18 represent generally any computing devices configured with browsers or other applications to communicate such requests and receive and process the corresponding responses. Link 20 represents generally one or more of a cable, wireless, fiber optic, or remote connections via a telecommunication link, an infrared link, a radio frequency link, or any other connectors or systems that provide electronic communication. Link 20 may include, at least in part, an intranet, the Internet, or a combination of both. Link 20 may also include intermediate proxies, routers, switches, load balancers, and the like.

COMPONENTS: FIGS. 2-3 depict examples of physical and logical components for implementing various embodiments. FIG. 2 depicts pattern identification system 12 in communication with data store 14. Data store 14 is shown as containing a communication entity sequence for analysis by system 12. In the example of FIG. 2, system 12 includes filter engine 22, cluster engine 24, detection engine 26, and identification engine 28. Filter engine 22 operates to remove communication entities from consideration that are plainly not push communications. Engines 24-28 analyze each remaining communication entity to determine if that entity has a push communication pattern.

Filter engine 22 represents generally any combination of hardware and programming configured to filter a sequence of communication entities to remove communication entities according to a criterion. The criterion is selected such that filtering excludes communication entities that cannot be push communications. For example, the criterion may cause filter engine 22 to examine the responses of each communication entity and retain a given entity only upon a determination that the response uses chunked transfer encoding. Filter engine 22 may also require that the content length of the response be zero or greater than a predetermined threshold. Filter engine 22 may accomplish this efficiently by examining only the response headers of the communication entities.

Cluster, detection, and identification engines 24, 26, and 28 then operate on the retained communication entities—those communication entities not removed by filter engine 22. Cluster engine 24 represents generally any combination of hardware and programming configured to create clusters from a given communication entity's response buffers. Each cluster is created such that is may potentially represent a different sub-message should the communication entity be identified as a push communication. Detection engine 26 represents any =combination of hardware and programming configured to detect which of those clusters meet a particular criterion. Identification engine 28 represents any combination of hardware and programming configured to identify the given communication entity as having a push communication pattern upon a determination that the detected clusters meet another criterion.

Elaborating on engines 24-28, cluster engine 24 may perform its function by examining the arrival times for each response buffer and grouping those response buffers in the same cluster if the difference in arrival times falls within a predetermined threshold. Response buffers, for example, may be socket level buffers into which the content of a response is fed. Closer arrival times between two buffers can indicate that the contents of those buffers are part of the same sub-message. Thus, where an arrival time for another buffer differs from the arrival time of the previous buffer by more than the predetermined threshold, that other buffer is grouped into a different cluster and presumably contains content of a different sub-message.

Detection engine 26 may perform its function by examining the clusters created by cluster engine 24 for the given communication entity. From the examination, detection engine 26 identifies or otherwise detects those clusters with content lengths below a predetermined threshold. That threshold is selected such that the detected cluster have a size indicative of a single sub-message (or a small number of small sub messages) of a push communication.

Identification engine 28 can then perform its function by comparing the clusters detected by detection engine 26 against that other criterion. That other criterion may be selected to ensure there is enough information to classify the communication entity as a push communication. The criterion may be selected to enforce a presumption that the communication entity's clusters, for the most part, have characteristics indicating they each represent a sub-message. The criterion can also be selected to help prevent misidentifying a communication entity used to transfer a large file as a push communication.

Thus, in a given implementation, identification engine 28 may identify a communication entity as having a push communication pattern only upon a determination of at least one of the following:
    that the detected clusters include a number of clusters that exceeds a predetermined threshold;
    that a percentage of detected clusters with respect to all created clusters exceeds a predetermined threshold, and
    that a percentage of the response length included in the detected clusters exceeds yet another predetermined threshold.
Requiring a threshold number of detected clusters helps ensures that there is enough information for classify a communication entity as a push communication. Requiring a high percentage of all clusters to be detected clusters follows a premise that all or most all clusters at a communication entity have characteristics indicative of a different sub-message. Finally, requiring that the detected clusters consume a given percentage of the total response length helps to eliminate communication entities used to transfer large files.

Identification engine 28 may also be responsible for communicating information related to the identified communication entities. For example, identification engine 28 may cause an update of a graphical user interface displaying details of the entities identified as having a push communication pattern. The update may call out or otherwise highlight a display of the communication entity details. The highlighting communicates that the corresponding entities have been identified as having a push communication pattern. Identifications may also communicate data indicative of the identified entities via an email or other network communication.

In foregoing discussion, engines 22-28 were described as combinations of hardware and programming. Such components may be implemented in a number of fashions. Looking at FIG. 3, the programming may be processor executable instructions stored on tangible, non-transitory computer readable medium 30 and the hardware may include processing resource 32 for executing those instructions. Processing resource 32, for example, can include one or multiple processors. Such multiple processors may be integrated in a single device or distributed across devices. Medium 30 can be said to store program instructions that when executed by processor resource 32 implements system 12 of FIG. 2. Medium 30 may be integrated in the same device as processor resource 32 or it may be separate but accessible to that device and processor resource 32.

In one example, the program instructions can be part of an installation package that when installed can be executed by processor resource 32 to implement system 12. In this case, medium 30 may be a portable medium such as a CD, DVD, or flash drive or a memory maintained by a server from which the installation package can be downloaded and installed. In another example, the program instructions may be part of an application or applications already installed.

Here, medium 30 can include integrated memory such as a hard drive, solid state drive, or the like.

In FIG. 3, the executable program instructions stored in medium 30 are represented as filter module 34, cluster module 36, detection module 38, and identification module 40 that when executed by processing resource 34 implement pattern identification system 12 (FIG. 2). Filter module 34 represents program instructions that when executed function as filter engine 22. Cluster module 36 represents program instructions that when executed implement cluster engine 24. Detection module 38 represents program instructions that when executed implement detection engine 26. Identification module 40 represents program instructions that when executed implement identification engine 28.

Figure 4:
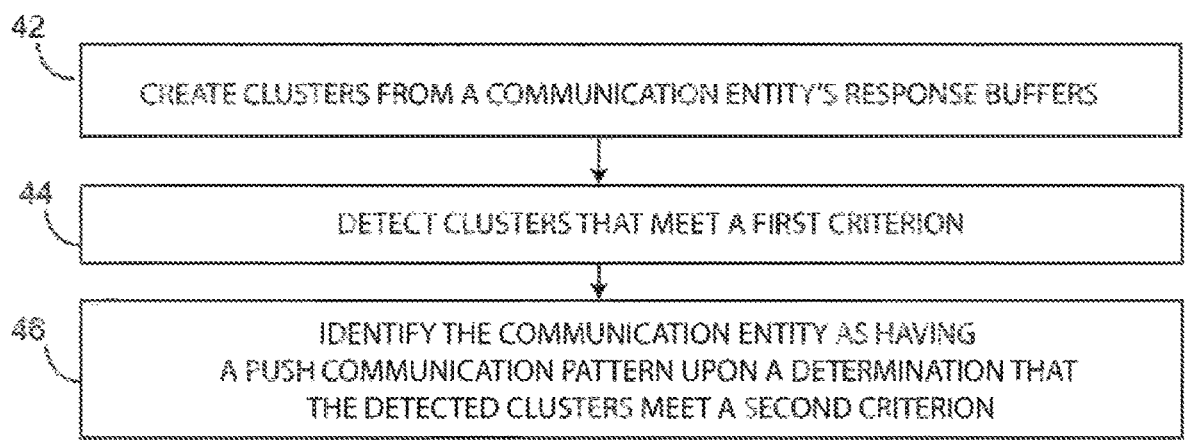
FIG. 4 is a flow diagram depicting steps taken to implement an example.

OPERATION: FIG. 4 is a flow diagram of steps taken to implement a method or identifying push communications. In discussing FIG. 4, reference may made to the diagrams of FIGS. 1-3 to provide contextual examples. Implementation, however, is not limited to those examples, in step 42, clusters are created from a communication entity's response buffers. Referring to FIG. 2, cluster engine 24 may be responsible for implementing step 42. The buffers, for example, may be socket level buffers grouped into clusters according to comparison of arrival times. Two buffers are grouped into the same cluster if the difference between their arrival times falls within a predetermined threshold. Buffers having close arrival times can include content of the same sub-message. Buffers with a large enough gap in arrival time can include content from different sub-messages. Thus, step 42 can include creating a plurality of clusters where each cluster may correspond to a different sub-message of a push communication.

Examining the clusters created in step 42, clusters that meet a first criterion are detected (step 44). Step 44, for example, may be implemented by detection engine 26 of FIG. 2. Step 44 can include detecting those clusters having lengths smaller than a predetermined threshold. That threshold is selected such that a detected cluster is of a size indicative of single sub-message or a relatively small amount of sub-messages.

The communication entity under consideration is the identified as having a push communication pattern upon a determination that the clusters detected in step 44 meet a second criterion (step 46). Referring to FIG. 2, step 46 may be implemented by identification engine 26. Step 46 can include identifying a communication entity as having a push communication pattern only upon a determination of at least one of the following:
that the detected clusters include a number of clusters that exceeds a predetermined threshold;
that a percentage of detected clusters with respect to all created clusters exceeds a predetermined threshold, and
that a percentage of the response length included in the detected clusters exceeds yet another predetermined threshold.

The criterion here is selected to help ensure there is enough information to classify the communication entity as a push communication, to enforce a presumption that the communication entity's clusters for the most part, each represent a sub-message, and to help prevent misidentifying a communication entity used to transfer a large file as a push communication.

Steps 42-46 may be repeated for a select list of communication entities. That list may be identified by filtering a sequence of communication entities to remove selected entities according to a third criterion. The retained entities make up the list. Filtering can include, for each communication entity in the sequence, examining a response header and retaining that communication entity only upon a determination of at least one of the following: (a) the transfer encoding is chunked and (b) that a content length is zero or greater than a predetermined threshold.

CONCLUSION: FIGS. 1-3 depict the architecture, functionality, and operation of various embodiments. In particular, FIGS. 2-3 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any computer-readable medium or use by or in connection with an instruction execution system such as a computer/processor based system or an ASIC (Application Specific Integrated Circuit) or other system that can fetch or obtain the logic from computer-readable medium and execute the instructions contained therein. "Computer-readable medium" can be any individual medium or distinct media that can contain, store, or maintain a set of instructions and data for use by or in connection with the instruction execution system. A computer readable medium can comprise any one or more of many physical, non-transitory media such as, for example, electronic, magnetic, optical, electromagnetic, or semiconductor media. More specific examples of a computer-readable medium include, but are not limited to, a portable magnetic computer diskette such as floppy diskettes, hard drives, solid state drives, random access memory (RAM), read-only memory (ROM), erasable programmable read-only memory, flash drives, and portable compact discs.

Although the flow diagram of FIG. 4 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method comprising:
  storing, by a computing device, received bytes in response buffers of a communication entity, the communication entity being a request-response pair of a request sent by a client device to a server device over a network and a corresponding response sent back by the server device to the client device over the network;
  measuring, by the computing device, arrival times of the bytes that are stored in the response buffers;
  creating, by the computing device, clusters of the response buffers of the communication entity based on the arrival times of the bytes in the response buffers;
  after creating the clusters of the response buffers of the communication entity, detecting, by the computing device, clusters with content lengths that are smaller than a first threshold, the first threshold set such that each of the detected clusters has no more than a predetermined number of sub-messages sent by the server device back to the client device;

determining that a number of the detected clusters exceeds a second threshold requiring that the detected clusters together constitute a predetermined percentage of a response length of the communication entity;

identifying, by the computing device, the communication entity as having a push communication pattern denoting that the communication entity is part of a communication between the client device and the server device based on the determination that each of the number of the detected clusters has a content length smaller than the first threshold and the determination that the number of the detected clusters exceed the second threshold; and displaying details of the communication entity on a graphical user interface (GUI).

2. The method of claim 1, comprising filtering a sequence of communication entities to remove communication entities according to a third threshold and, for each retained communication entity, performing the creating, detecting, and identifying.

3. The method of claim 2, wherein the filtering comprises, for each communication entity, examining a response header and retaining that communication entity only upon a determination of at least one of:

that a transfer encoding is chunked; and that the content length of one of the number of detected clusters is zero or greater than a predetermined threshold.

4. The method of claim 1, wherein the creating the clusters comprises grouping a first response buffer with a second response buffer according to a comparison of the arrival times of the bytes stored in the first and second response buffers.

5. The method of claim 1, wherein the identifying comprises identifying the communication entity as having the push communication pattern upon a determination of at least one of the following:

that a percentage of the detected clusters with respect to all created clusters exceeds a third predetermined threshold; and that a percentage of a response length included in the detected clusters exceeds a fourth predetermined threshold.

6. The method of claim 1, wherein the communication entity is identified as having the push communication pattern responsive to determining that the number of the detected clusters exceeds the second threshold, wherein the second threshold ensures that there are a minimum number of the detected clusters to classify the communication entity as having the push communication pattern.

7. The method of claim 1, wherein the communication entity is identified as having the push communication pattern responsive to determining that a percentage of the detected clusters, relative to the created clusters, exceeds the second threshold, wherein the second threshold ensures that a minimum percentage of the created clusters are indicative of different sub-messages.

8. The method of claim 1, wherein creating clusters from the response buffers, by the computing device further comprises:

creating, by the computing device, a single cluster of response buffers wherein differences between respective byte arrival times of the response buffers of the single cluster fall within a predetermined threshold.

9. A non-transitory computer readable medium having instructions stored thereon that when executed by a processor of a computing device implement a system comprising:

instructions that cause the processor to store received bytes in response buffers of respective communication entities;

instructions that cause the processor to measure arrival times of the bytes in the response buffers of the respective communication entities;

a filter engine, a cluster engine, a detection engine, and an identification engine, wherein the filter engine is configured to filter a sequence of the communication entities to remove communication entities according to a first criterion, and for each remaining communication entity:

the cluster engine is configured to create clusters of the remaining communication entity's response buffers by the arrival times of the bytes in the remaining communication entity's response buffers;

the detection engine is configured to, after creation of the clusters, detect clusters with content lengths that are smaller than a first threshold; and the identification engine is configured to, after the creation of the clusters and in response to determining that a predetermined percentage of the detected clusters exceeds a second threshold that requires the predetermined percentage of the detected clusters together constitute a response length of the communication entity, identify the remaining communication entity as having a push communication pattern, wherein each community entity is a request-response pair of a request sent by a client device to a server device over a network and a corresponding response sent back by the server device to the client device over the network, the first threshold specifies that each of the detected clusters includes no more than a predetermined number of sub-messages sent by the server device back to the client device, wherein the push communication pattern denotes that the communication entity, having the push communication pattern, is part of a communication between the client device and the server device; and instructions that cause the processor to display details of each communication entity identified as having the push communication pattern on a graphical user interface (GUI).

10. The medium of claim 9, wherein the filter engine is configured to filter by examining a response for each communication entity and retaining a given communication entity only upon a determination of at least one of:

that the response uses chunked transfer encoding; and that the content length of the response is zero or greater than a predetermined threshold.

11. The medium of claim 9, wherein the cluster engine is configured to create by:

grouping a first response buffer with a second response buffer in a first cluster upon a determination that the difference between the arrival times for the first and second response buffers falls within a predetermined threshold; and grouping a third response buffer in a second cluster upon a determination that a difference between the arrival times of the second and third buffer falls outside the predetermined threshold.

12. The medium of claim 9, wherein the identification engine is configured to identify a communication entity as having a push communication pattern only upon a determination of at least one of the following:
   that a percentage of the detected clusters with respect to all created clusters exceeds a third predetermined threshold; and
   that a percentage of the response length included in the detected clusters exceeds a fourth predetermined threshold.

13. A system comprising:
   a processor; and
   a non-transitory computer readable medium with which the processor is in communication, the non-transitory computer readable medium containing a set of instructions executable by the processor to:
   store received bytes in response buffers of a communication entity that is a request-response pair of a request sent by a client device to a server device over a network and a corresponding response sent back by the server device to the client device over the network;
   measure arrival times of the bytes in the response buffers of the communication entity;
      create clusters of the response buffers of the communication entity based on the arrival times of the bytes;
      after creating the clusters of the response buffers of the communication entity, detect clusters with content lengths that are smaller than a first threshold which ensures that each of the detected clusters includes no more than a predetermined number of sub-messages sent by the server device back to the client device; and
      after creating the clusters, determine that a number or percentage of the detected clusters exceeds a second threshold that requires the detected clusters together constitute a predetermined percentage of a response length of the communication entity;
   identify the communication entity as having a push communication pattern denoting that the communication entity is part of communication between the client device and the server device based on the determination that each of the number of the detected clusters have content lengths smaller than the first threshold and the determination that the number of the detected clusters exceed the second threshold; and
   display details of the communication entity on a graphical user interface (GUI).

14. The system of claim 13, wherein the set of instructions is executable by the processor to further filter a sequence of communication entities to remove communication entities according to a third criterion and, for each retained communication entity, perform the creating, detecting, and identifying.

15. The system of claim 13, wherein the set of instructions is executable by the processor to further filter by, for each of communication entities, examining a response header and retaining that communication entity only upon a determination of at least one of:
   that a transfer encoding is chunked; and
   that the content length is zero or greater than a predetermined threshold.

16. The system of claim 13, wherein the set of instructions is executable by the processor to further create by grouping a first response buffer with a second response buffer according to a comparison of arrival times for the first and second response buffers.

17. The system of claim 13, wherein the set of instructions to identify a communication entity as having a push communication pattern is based upon a determination of at least one of the following:
   that a percentage of the detected clusters with respect to all created clusters exceeds a third predetermined threshold; and
   that a percentage of a response length included in the detected clusters exceeds a fourth predetermined threshold.

* * * * *